UNITED STATES PATENT OFFICE 2,529,142

RESINOUS COMPOSITION SUITABLE FOR ANION EXCHANGE

James R. Dudley, Cos Cob, Conn., assignor to American Cyanamid Company, New York, N. Y., a corporation of Maine No Drawing. Application February 20, 1946, Serial No. 649,127

1 Claim. (Cl. 260—67.6)

This invention relates to granular water- and acid-insoluble resinous materials and more particularly, to such materials capable of removing anions from liquid, to processes of preparing the resinous materials, and to processes of treating liquids to remove anions therefrom by means of the resinous materials.

In the past, formaldehyde condensation products of aminotriazines such as melamine have been condensed with strongly basic, non-aromatic amines, the condensation products have been neutralized with acid, and the resulting neutral solutions have been vacuum concentrated to produce water-insoluble, dilute acid-soluble resinous solids. This process is described in the Bock and Houk Patent 2,210,831. The resin solutions prepared according to this patent do not gel and have no anion exchange activity.

It is an object of the present invention to prepare a granular water- and acid-insoluble resin from a mixture of an aminotriazine, an aldehyde, and a strongly basic non-aromatic amine.

It is another object of the present invention to provide a water- and acid-insoluble resin which is suitable for removing anions from, or exchanging anions in, water and other liquids.

It is still another object of the present invention to provide a process for the preparation of granular, water- and acid-insoluble resins suitable for the removal of anions from liquid.

These and other objects may be attained by bringing about reaction between an aminotriazine, an aldehyde, and a strongly basic, non-aromatic amine, acidifying the reaction product to a pH of from 2 to 4, drying the acidified product by heating, and granulating the heated, dried product.

Another object of the present invention is to provide a process for removing anions from liquids containing them.

This and other objects are attained by contacting liquid containing anions with the granular water- and acid-insoluble resins described above.

The invention will be described in greater detail in conjunction with the following specific examples which are merely illustrative and not intended to be restrictive of the scope of the invention. Proportions are given in parts by weight unless otherwise indicated.

Example 1

63 parts of melamine (0.5 mol)
202.5 parts of a 37% aqueous solution of formaldehyde (2.5 mols)
75 parts of a 30% aqueous solution of dimethyl amine (0.5 mol)
56 parts of 37% hydrochloric acid (0.59 mol)

The melamine and the aqueous formaldehyde solution which has been neutralized with triethanolamine to a pH of about 7–8 are heated together at about 75°–80° C. until solution occurs. The solution is cooled to about 50°–60° C. whereupon an aqueous solution of the dimethyl amine is added thereto. The hydrochloric acid is then added to the reaction mixture which gels in a few hours time. The gel is allowed to stand for about 12 hours and is then ground and cured for 4 hours at 50° C. and 4 hours at 100° C. The cured resin is again ground, screened and the 20–40 mesh material evaluated. The resin has a capacity of 12.1 kilograins of calcium carbonate per cubic foot of resin and a density of 27.3 lbs./cu. ft.

Example 2

84 parts of melamine (.67 mol)
267 parts of a 37% aqueous solution of formaldehyde (3.3 mols)
75 parts of a 30% aqueous solution of dimethyl amine (0.5 mol)
71 parts of 37% hydrochloric acid (0.72 mol)

The procedure of Example 1 is followed and the resin obtained has a capacity of 10.7 kilograins of calcium carbonate per cubic foot of resin and a density of 28.9 lbs./cu. ft.

Example 3

63 parts of melamine (0.5 mol)
202.5 parts of a 37% aqueous solution of formaldehyde (2.5 mols)
64.3 parts of a 70% aqueous solution of monoethyl amine (1.0 mol)
93.6 parts of 37% hydrochloric acid (0.95 mol)

The procedure of Example 1 is followed. The resin obtained has a capacity of 9.9 kilograins of calcium carbonate per cubic foot of resin and a density of 24.8 lbs./cu. ft.

Example 4

84 parts of melamine (0.67 mol)
267 parts of a 37% aqueous solution of formaldehyde (3.3 mols)
32 parts of a 70% aqueous solution of monoethylamine (0.5 mol)
81.8 parts of 37% hydrochloric acid (0.83 mol)

The procedure of Example 1 is followed and the resin obtained has a capacity of 7.3 kilograins of calcium carbonate per cubic foot of resin and a density of 29.8 lbs./cu. ft.

Example 5

216 parts of trimethylol melamine (1 mol)
74 parts of diethylamine (1 mol)
66 parts of 37% hydrochloric acid (.67 mol)

The procedure of Example 1 is followed. The resin obtained has a density of 12.2 lbs./cu. ft. and a fair capacity for removing anions from liquids.

Example 6

63 parts of melamine (0.5 mol)
202.5 parts of a 37% aqueous solution of formaldehyde (2.5 mols)
43.5 parts of morpholine (0.5 mol)
58 parts of 37% hydrochloric acid (0.59 mol)

The procedure of Example 1 is followed. The resin obtained has a capacity of 9.7 kilograins of calcium carbonate per cubic foot of resin and a density of 25.5 lbs./cu. ft.

Example 7

84 parts of melamine (0.67 mol)
267 parts of a 37% aqueous solution of formaldehyde (3.3 mols)
43.5 parts of morpholine (0.5 mol)
71 parts of 37% hydrochloric acid (0.72 mol)

The procedure of Example 1 is followed and the resin obtained has a capacity of 8.4 kilograins of calcium carbonate per cubic foot of resin and a density of 26.0 lbs./cu. ft.

Any amino-1,3,5-triazine may be substituted for the melamine of the specific examples. Some of these triazines which contain a primary amino group are ammeline, thioammeline, ammelide, thioammelide, di-thioammelide, guanamines such as formoguanamine, acetoguanamine, stearoguanamine, lauroguanamine, benzoguanamine, etc., halogenated amino-1,3,5-triazines such as 2-chlor-4,6-diamino-1,3,5-triazine, 2-amino-4,6-dichlor-1,3,5-triazine, 2 brom-4,6-diamino-1,3,5-triazine, etc., guanides where the hydrocarbon substituent may be, for example, methyl, ethyl, butyl, benzyl, phenyl, cyclohexyl, decyl, dodecyl, octadecyl, etc. Obviously commercial mixtures of the various aminotriazines may also be used. One example of such a commercial mixture is the product obtained by heating dicyandiamide sufficiently to obtain an amount of melamine together with other reactive aminotriazine bodies.

Similarly, formaldehyde may be replaced in the reaction mixture by another aldehdye such as acetaldehyde, propionaldehyde, butyraldehyde, benzaldehyde, cinnamyl aldehdye, furfural, etc. Polymers of formaldehyde or substances which yield formaldehyde may be used in place of formaldehyde itself and, furthermore, mixtures of one or more aldehydes may be employed.

Any non-aromatic, strongly basic amine containing at least one reactive hydrogen atom attached to the nitrogen atom and having a maximum of 8 carbon atoms in any single group may be used in the preparation of the resinous compositions of the present invention. Examples of such amines include monomethyl amine, dimethyl amine, monoethyl amine, diethyl amine, monobutyl amine, di-isobutyl amine, monoethanol amine, diethanol amine, monocyclohexyl amine, dicyclohexyl amine, monobenzyl amine, dibenzyl amine, monoallyl amine, diallyl amine, mono-octylamine, di-2-ethylhexyl amine, monohexyl amine, etc. Mixed amines may also be used such as methyl ethyl amine, methyl benzyl amine, etc. Heterocyclic amines including morpholine, piperidine, piperazine, pyrrolidine, etc., are likewise suitable for use according to the present invention. Mixtures of one or more of these amines may also be used.

The three major reactants may be combined in any order without departing from the spirit of the present invention. If desired the aminotriazine and the aldehyde may be condensed, and the amine added to the condensation product. It is also possible to add the aminotriazine to a condensation product of the amine and the aldehyde, or to add the aldehyde to a mixture of the amine and the aminotriazine. Furthermore, all three substances may be combined simultaneously.

Any suitable acid may be used as a neutralizing agent for the initial condensation product. The concentrated hydrochloric acid of the examples may be replaced by sulfuric acid, phosphoric acid, acetic acid, oxalic acid, etc.

The proportions of aminotriazine to aldehyde to amine may vary considerably although, in general, I prefer to maintain the molar ratio within the range of 1:3:1 to 2:8:1.

The anion active resins may be activated or regenerated after exhaustion by means of dilute alkaline solutions such as for example, 0.1 to 10% aqueous solutions of sodium hydroxide, sodium carbonate, etc.

The resinous materials produced in accordance with this invention are suitable for the removal of all kinds of acids and anions in general from liquid media, and for the exchange of all such anions in liquid media. They may be used to extract the strong mineral acids (preferably in relatively low concentrations) and organic acids such as acetic acid, oxalic acid, etc., from water. The anions of solids such as chloride anion from ammonium chloride and sulphate anion from ammonium sulphate may be removed by means of the resinous products described herein.

The anion active resins are useful for many purposes. Some of these uses are the removal of acid from water, the removal of acid from alcoholic solution, the purification of aqueous solutions containing sugar including sugar juices, the purification of pectin, the removal of acid from aqueous formaldehyde solutions, etc. While the resins are especially suitable for the removal of anions from aqueous media, they may be used to extract acids or anions from liquid media other than water. The resins may be used as absorbents for plant nutrients and as such may be used as media for growing plants or as a means for applying nutrients to the soil.

To be sufficiently insoluble for practical use in the water purification art, resins should have a sufficiently low solubility that they will not be dissolved rapidly by the solution to be treated. Thus water should not dissolve more than one part of resin in 1000 parts of water when passed through a bed of resin after the first cycle comprising an activation, an exhaustion, and a reactivation of the resin.

It is preferable to grind and screen the resins to a particle size of from about 8–60 mesh. Use of larger particles causes channeling and smaller particles of resins have been found to pack, thus reducing the anion exchange efficiency of material.

I claim:

A method of making a resinous composition suitable for anion exchange which comprises mixing 63 parts of melamine with 202.5 parts of 37% aqueous solution of formaldehyde which has been neutralized to a pH of about 7 to 8 with triethanolamine, heating the mixture at a temperature of 75° to 80° C. until solution occurs, cooling the resulting solution to a temperature of about 50° to 60° C., adding 75 parts of a 30% aqueous solution of dimethylamine, thereafter adding 56 parts of 37% hydrochloric acid, allowing the resulting mixture to gel, aging the gelled solution for about 12 hours, grinding the thus aged gel, curing the ground gel at 50° C. for 4 hours and at 100° C. for 4 hours to produce a cured resin, grinding the cured resin and screening the thus ground resin to obtain a 20 to 40 mesh material.

JAMES R. DUDLEY.

REFERENCES CITED

The following references are of record in the file of this patent:

UNITED STATES PATENTS

| Number | Name | Date |
| --- | --- | --- |
| 2,228,514 | Griessbach | Jan. 14, 1941 |
| 2,251,234 | Swain | July 29, 1941 |
| 2,285,750 | Swain | June 9, 1942 |
| 2,341,907 | Cheetham | Feb. 15, 1944 |
| 2,388,235 | Bowman | Nov. 6, 1945 |

FOREIGN PATENTS

| Number | Country | Date |
| --- | --- | --- |
| 898,175 | France | June 26, 1944 |
| 566,789 | Great Britain | Jan. 15, 1945 |